Patented Jan. 7, 1936

2,026,900

UNITED STATES PATENT OFFICE 2,026,900

METHOD OF MANUFACTURING REFINED PULP FROM STRAW OF GRAMINACEOUS PLANTS

Kenta Kodama, Fukui, Japan

No Drawing. Application June 3, 1935, Serial No. 24,778. In Japan October 19, 1934

4 Claims. (Cl. 92—9)

The present invention relates to a method of manufacturing refined pulp from straw of graminaceous plants, which consists in digesting straw of graminaceous plants in an acidic solution containing acidic sodium sulphate and hydrogen chloride obtained by adding sulphuric acid to sea-water or brine so that decomposition may take place in part of pectin substance and other impure matters; then digesting the same in caustic soda solution to dissolve the remaining impurities and thus separating and collecting cellulose. The object thereof is to manufacture economically from straw of graminaceous plants refined pulp consisting of α cellulose which is most suitable as the raw material for artificial silk and regenerated cellulose and fibre.

For the manufacture of pulp from graminaceous straw, it is usual to depend upon alkali-digestion with caustic soda or/and sodium sulphide. In this case, the quantity of caustic soda necessary for obtaining refined pulp by dissolving pectin substance and other impurities is about as big as 30% of the weight of the raw material, namely straw, in digestion under the normal pressure and is not only 15–20% even in digestion under the pressure of 60 lbs. per sq. inch, but also the time required for the digestion is from 7 to 10 hours and that with the difficulty of obtaining a pure product.

The present invention is characterized by digesting straw of graminaceous plants in an acidic solution containing acidic sodium sulphate and hydrogen chloride obtained by adding sulphuric acid to sea-water or brine (sea-water may be regarded as about 2.5% brine) as the preliminary step for alkali-digestion. In this digestion, portion of pectin substance and other impurities are decomposed and in the following alkali digestion the remaining impure matters may be dissolved out easily.

When sulphuric acid is added to sea-water or brine, acidic sodium sulphate and hydrogen chloride, namely hydrochloric acid will be produced by its double decomposition with sodium chloride. Thus, this solution contains acidic sodium sulphate and hydrogen chloride besides sodium chloride and, when sea-water is employed, has also magnesium salts (the sea-water contains about 0.6–0.7% of magnesium salts). As cellulose is considerably spoiled if the straw is digested with dilute sulphuric acid, it is very important that no free sulphuric acid should stay in an acidic digesting solution. That is to say, the quantity of sulphuric acid to be added to sea-water or brine needs be smaller than that necessary for converting the sodium chloride contained in the latter wholly into acidic sodium sulphate. Usually, about less than half of the quantity calculated chemically is employed.

For example, if 135 grams of pure sulphuric acid is added to 10 litres of 2.5% sodium chloride solution, nearly 80 grams out of the whole quantity, namely 250 grams of sodium chloride will take part in the reaction, about 170 grams remaining undecomposed. Accordingly, the constituents of this solution have roughly the following proportions:—

| | Percent |
|---|---|
| $NaHSO_4$ | 1.65 |
| $HCl$ | 0.5 |
| $NaCl$ | 1.70 |

Thus, it is possible to obtain an acidic digesting solution without free sulphuric acid. Of the above-mentioned different constituents, the one effective for the decomposition of pectin substance and other impurities is hydrogen chloride, which acts upon them most strongly, while acidic sodium sulphate acts mildly and slowly. Hydrogen chloride is not merely effective for the decomposition of the impure matters, but also on the other hand has the action of decomposing cellulose if its quantity is too large. However, the presence of acidic sodium sulphate checks this harmful action of hydrogen chloride upon cellulose and also co-existing sodium chloride performs negative catalytic action to do the same. Further, when sea-water is used, there is the advantage of magnesium salts contained therein doing the similar checking action. Thus, a mixed solution of these constituents is suitable and effective for the decomposition of the impurities without spoiling cellulose.

However, with the above acidic digesting solution alone it is hard to produce pure pulp from straw of graminaceous plants, because of the fact that the separation of the impurities is only partial and the separation of silicic acid portion and other impure matters is incomplete with an acidic solution. These staying impurities being easily soluble in alkali, are subjected to alkali-digestion, that is, are digested in caustic soda solution. The quantity of caustic soda required in this case may be only less than about 20–30% of that in the ordinary alkali-digestion and therefore it is economical.

The following is an example of carrying out this invention into practice.

After adding 8,000 to 10,000 kilograms of sea-water and 100 to 150 kilograms of concentrated sulphuric acid to 1,000 kilograms of rice straw, digest the straw for 3 to 4 hours under the normal pressure and wash it with water. Next, digest the brown crude fibre thus obtained for 4 to 5 hours under the normal pressure with the addition of 6,000 to 8,000 kilograms of water and 75 to 120 kilograms of caustic soda and wash it with water. Then, bleach it with chlorine, and fibre will be obtained.

The above-mentioned is a digesting process under the normal pressure, but if a digesting process under increased pressure is adapted, the digesting hour may not only be reduced by half, but also the necessary chemicals may be economized considerably. By the way, when sea-water is not to be had, it may be substituted by 250 kilograms of sodium chloride disolved in 1,000 kilograms of water. The quantities and time described in the above example may be changed suitably without departing from the spirit of this invention.

The quantity of the refined pulp produced from 1,000 kilograms of rice straw is from 350 to 360 kilograms.

The waste acidic digesting liquor can not only be used repeatedly several times as it is or with the addition of fresh liquor, but also the waste caustic soda digesting liquor may be used repeatedly by recovering caustic soda from it by a suitable process.

Not alone rice straw, but all kinds of graminaceous straws such as wheat, Kaoliang straws, etc. may be manufactured into refined pulp by this method. The refined pulp produced from straw of graminaceous plants consists of $\alpha$ cellulose of comparatively good quality and does not contain $\beta$ cellulose, so that it is most suitable for the raw material for artificial silk and regenerated cellulose and fibre. Moreover, according to this method such a thing as the sea-water which can be had freely may not only be employed as a treating agent, but also caustic soda can be economized. Accordingly, the cost of production is small.

I claim:

1. Method of manufacturing refined pulp from straw of graminaceous plants, which consists in digesting straw of graminaceous plants in an acidic solution containing acidic sodium sulphate and hydrogen chloride obtained by adding sulphuric acid to sea-water or brine so that decomposition may take place in part of pectin substance and other impure matters; then digesting the same in caustic soda solution to dissolve the remaining impurities and thus separating and collecting cellulose.

2. Method of manufacturing refined pulp from straw of graminaceous plants, which consists in digesting straw of graminaceous plants in an acidic digesting solution without free sulphuric acid which is obtained by adding to a solution containing sodium chloride the smaller quantity of sulphuric acid than is necessary for wholly decomposing the sodium chloride; so that decomposition may take place in part of pectin substance and other impure matters; then digesting the same in caustic soda solution to dissolve the remaining impurities and thus separating and collecting cellulose.

3. Method of manufacturing refined pulp from straw of graminaceous plants, which consists in digesting straw of graminaceous plants in an acidic digesting solution containing acidic sodium sulphate, hydrogen chloride and sodium chloride so that decomposition may take place in part of pectin substance and other impure matters; then digesting the same in caustic soda solution to dissolve the remaining impurities and thus separating and collecting cellulose.

4. Method of manufacturing refined pulp from straw of graminaceous plants, which consists in digesting an acidic digesting solution containing acidic sodium sulphate, hydrogen chloride, sodium chloride and magnesium salts so that decomposition may take place in part of pectin substance and other impure matters; then digesting the same in caustic soda solution to dissolve the remaining impurities and thus separating and collecting cellulose.

KENTA KODAMA.